Figure 1:
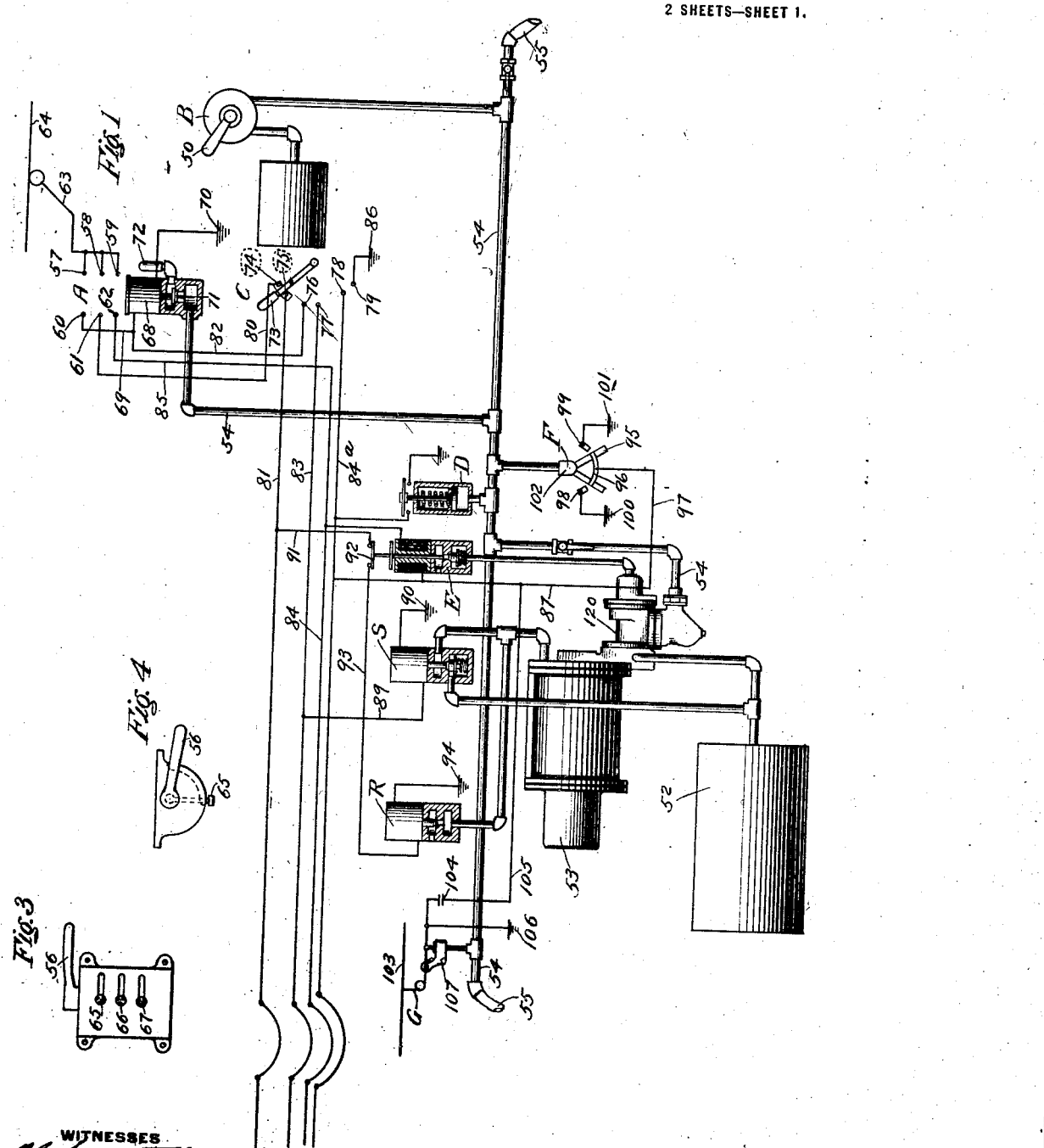

J. S. DOYLE.
ELECTROPNEUMATIC BRAKE FOR RAILWAY CARS.
APPLICATION FILED APR. 23, 1910.

1,141,109.

Patented June 1, 1915.
2 SHEETS—SHEET 1.

WITNESSES

INVENTOR

UNITED STATES PATENT OFFICE.

JAMES S. DOYLE, OF NEW YORK, N. Y., ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC BRAKE FOR RAILWAY-CARS.

1,141,109.   Specification of Letters Patent.   Patented June 1, 1915.

Application filed April 23, 1910. Serial No. 557,186.

*To all whom it may concern:*

Be it known that I, JAMES S. DOYLE, a citizen of the United States, residing in the city, county, and State of New York, have made a certain new and useful Invention in Electropneumatic Brakes for Railway-Cars, of which the following is a specification.

One object of the invention is to provide a multiple unit system of electro-pneumatic brake control for railway cars which is simple and efficient.

A further object is to provide a brake control system of the character referred to wherein provision is made for converting the car running motor into a generator in case of failure of line current, thereby supplying current for an electro-pneumatic emergency or service application of the brakes.

A further object of the invention is to provide an interlock arrangement whereby in case of an emergency application of the brakes, the service control of the release of the brakes is rendered inoperative.

A further object is to provide means in a brake control system of the character referred to whereby an emergency application of the brakes to avoid accident is effected automatically and a warning or signal is given to the motorman of such application in case of failure of the system at any point to properly operate in the performance of the required functions.

A further object is to provide an electropneumatic system of brake control wherein the brakes are automatically applied in emergency and a signal is given, if, for any reason, the line current or potential of the supply current, (trolley, third-rail or the like) is lost.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

In Patent No. 1,090,841, dated March 24, 1914, I have shown, described, and claimed an electro-pneumatic brake control mechanism, wherein provision is made for effecting an emergency application of the brakes under certain contingencies encountered in the operation of cars or trains.

The present invention relates more particularly to multiple unit systems of electropneumatic brake control apparatus of the same general character, and the special objects are to provide means in such a system to render the same reliable and efficient in operation, to provide against accidents in the operation of street or other railway systems while at the same time reducing the time interval between trains or cars operating over a street or railway car system, and to equip all the cars of a train with such a system and to so couple up the cars that they may operate in unison or singly if cut out of the train.

The demands of modern urban, sub-urban, and inter-urban street or other railway car service, whether surface elevated or underground, require that rapid transit be furnished while permitting the handling of congested traffic. These requirements have given rise to the practice of operating the cars at high speed, and also of operating them in trains made up of many cars. By increasing the speed of operation of cars, and the number of cars employed in trains, necessary to handle large or congested traffic, and to secure rapid transit, increased difficulties are encountered, and increased liability to accident, by reason of collision or otherwise, is incurred. This is especially true where it is endeavored to shorten the time schedule of operation of cars over a street or railway car system, and also where it is endeavored to reduce the headway distance between trains or cars. In securing and insuring greater safety to life and property in the operation of such street or railway car systems, under the modern conditions of operation referred to, and in accordance with the principles of my invention, I propose to employ a brake mechanism and to control the same electrically and pneumatically, both for service stops, under normal conditions of operation, and for securing an automatic emergency application of the brakes in case of accident, or failure for any cause of the line current supply and under various conditions of exigency that may arise. I also propose to similarly equip each car, and, where the cars are coupled up into a train, to provide suitable train connections whereby I am enabled to secure a multiple unit system of brake equipment and control.

In carrying out my invention I employ a master switch mechanism through which control is maintained of emergency as well as service applications of the brakes, and the release thereof, and also through which, if desired, as exemplified in one form of my invention, control is effected of the motor circuit connections, whereby, in case of failure of the line current supply while the car or train is under headway, the motors are converted into generators and thus not only serve to exert a braking effort but also to supply current to effect an emergency or other application of the brakes. I also provide an interlock system whereby the service control of the brake release is rendered inoperative in case of an emergency application of the brakes. These and other features, purposes, and characteristics of my invention may be practically accomplished in a wide variety of specifically different ways, and in synchronous relation throughout a train of cars. While, therefore, I have shown, and will hereinafter describe various specific arrangements of the various features of my invention which have proven satisfactory for the purpose, it is to be understood that in its broadest scope, my invention, as defined in the claims, is not to be limited or restricted to the specific details of arrangement shown.

Figure 2:
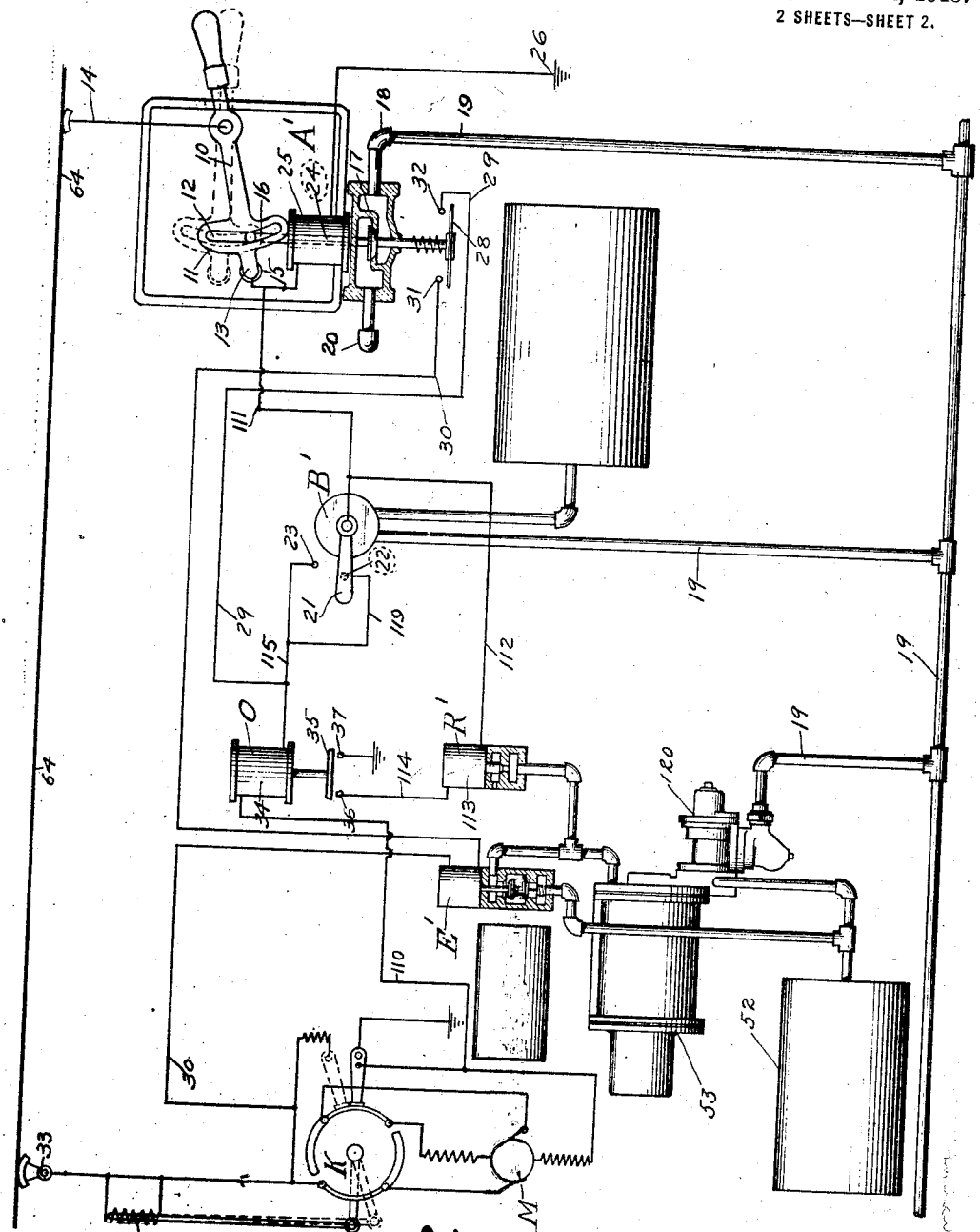

Referring to the accompanying drawings:—Figure 1 is a view, somewhat diagrammatic, showing a multiple unit system of electro-pneumatic brake control apparatus as applied to a car, and which embodies the principles of my invention. Fig. 2 is a diagram illustrating a slightly modified construction and arrangement embodying the same. Figs. 3 and 4 are detail views in side elevation and top plan, respectively, of a form of master controller switch adapted for use in connection with my invention.

In the multiple-unit equipment of cars in accordance with the principles of my invention, the arrangement is the same on all cars. I have therefore shown an equipment for only one car; it being understood that the arrangement is duplicated on each car of a train, the various circuit and pipe connections being suitably coupled up intermediate adjacent cars in the well known way.

In accordance with my invention various arrangements may be employed for controlling the operation of the brake mechanism. I have shown an ordinary motorman's brake valve adapted to be operated by the motorman in the usual way to apply and release the brakes pneumatically. I have also shown an electric switch device which is also operated by the motorman to control the brakes electrically, but the circuit of which may also be under the control of the master switch. I have also shown an electro-pneumatic emergency control arrangement adapted to be operated automatically in various ways, and under various operating exigencies. In case of failure of the line potential when a car, or a train of cars, is under headway I provide means whereby the car operating motors may be employed as generators, and the current thus generated utilized to electrically effect an application of the brakes, in addition to the braking action caused by the motors operating as generators. In addition to this the motor-generator may also, and obviously, be employed to reversely rotate the car wheels if necessary or desired, in an emergency, to secure a quick stop to avert a collision or other accident. I also provide means whereby in case of an emergency or other electro-pneumatic application of the brakes under exigency to prevent accident, the service release of the brake mechanism which is under the control of the motorman cannot be operated. These and other features to be more fully explained hereinafter constitute in their coöperative arrangement and relation the principal characteristics of my invention.

Referring particularly to Fig. 1, reference sign A, designates generally the master switch arrangement, B the motorman's brake valve, C the motorman's electric brake controlling switch, D the fluid pressure controlled emergency switch device, E, S, and R, respectively the electric emergency, service, and release control devices, F an emergency trip device, and G a conductor's cord control arrangement for securing an electro-pneumatic emergency application of the brakes. The fluid pressure brake apparatus on the car may be of the usual type comprising a motorman's brake valve B having the usual operating handle 50, brake pipe 54, auxiliary reservoir 52, brake cylinder 53, and automatic or triple valve device 120, the brake pipe 54 of the cars being connected up between cars by the hose couplings 55. The master switch A comprises, as shown in Figs. 1, 3 and 4, a control handle 56, designed to operate a contact making device to simultaneously close circuit connection between a series of contacts 57, 58 and 59, and the respective contacts 60, 61 and 62. The contacts 57, 58 and 59, are connected up to the source of line current, as, for instance, through conductor 63, to the over head trolley or third rail, indicated at 64. The contact making device controlled by handle 56, also is equipped with individual switches 65, 66, 67, arranged to individually open the circuit connection between the contacts 57, 58 and 59, and their respectively corresponding and coöperating contacts 60, 61, 62, so that any one or more of these contact connections may be broken independently of the others. The contacts 57, 60, control the circuit of a magnet 68, through conductor 69, to ground at 70. When this circuit is closed and the magnet is energized, a valve 71, associated with the brake pipe 54, is closed. When said valve is opened, the pressure in the brake pipe 54 is reduced by escaping to atmosphere at 72, thereby effecting an application of the brakes. The escape of air at 72, may, if desired, be utilized to sound a signal such as a whistle to inform the motorman of the application of the brakes. The circuit of magnet 68 will be broken, or said magnet will become deënergized in case of failure of the line potential for any cause, thereby automatically effecting an application of the brakes. The motorman's electric switch C, comprises a control handle 73, arranged to control circuit connection between the pairs of contacts 74, 75; 76, 77; and 78, 79. The contact 74 is connected through conductor 80 with the contact 61, while the coöperating contact 75 is connected to a line conductor 81, extending throughout the entire length of the train, being suitably coupled up intermediate adjacent cars of the train. This conductor I will call the release circuit, as the brake release device R, on each car is controlled by current supplied through this circuit. The contact 76 is connected through conductor 82 with contact 60, while the coöperating contact 77, is connected to a line conductor 83, extending throughout the train, and which I will call the electric service control circuit, as the device S, on each car of the train is supplied with current from this circuit conductor, the device S operating in the usual manner to effect a service application of the brakes. The contact 78 is connected by a wire 84ª with an emergency electrical control device E, on each car of the train, adapted, when energized, to effect an emergency application of the brakes. The contact 79, is connected to ground at 86. The arrangement of the emergency line circuit 84ª, and its connections, is such that whenever said circuit is grounded at any point, an electro-pneumatic emergency application of the brake mechanism is effected simultaneously on all the cars of the train, by reason of the energization of the magnet of the device E. The device D, comprises an emergency device which, when acted upon by a reduction in train pipe pressure operates a switch to ground the emergency line 84ª. The circuit of the device S on each car is completed from the train line conductor 83, through conductor 89, to ground, as at 90. The circuit of the release device R, on each car is completed from train line conductor 81, through conductor 91, switch device 92, and conductor 93, to ground, as at 94. The switch device 92 is controlled by the emergency control device E, in such manner that when the device E is energized the circuit of release device R, is broken. This provides a simple and efficient interlock whereby in case of an emergency application of the brakes the release devices R throughout the train are cut out of the control of the motorman. The trip device F, comprises a rocking member 95, arranged to be rocked in one direction or another, according to the direction of travel of the car, by striking stops placed at convenient points along the line of the road. The member 95, carries a contact strip 96, which is connected through conductor 97, with the circuit of the emergency control device E. The strip 96, coöperates with the contacts 98, 99, according to the direction in which the member 95 is rocked. The contacts 98, 99, are respectively grounded as at 100, 101. The rocking member 95, may also, if desired, serve to operate a valve indicated at 102, and communicating with the train pipe 54, to effect a reduction of train pipe pressure and a consequent application of the brakes. The conductor's cord device G, may serve to provide another means for grounding the circuit of the emergency control device E. In this case the cord 103, may operate a switch device 104, to connect the conductor 105 to ground at 106, the conductor 105, being connected to the circuit of emergency control device E. The switch device 104, may also serve to operate a valve, indicated at 107, to effect a reduction of train pipe pressure and a consequent application of the brakes.

From the foregoing description it will be seen that the motorman maintains the ordinary control of the brake system through the brake valve B. Also, that when the master switch device A is closed, a service application of the brakes is effected by bringing the lever 73 into position to close the circuit connection between contacts 76 and 77. An emergency application of the brakes may also be effected by grounding the wire 84ª through contacts 78, 79, and the release of the brakes is effected by coupling up contacts 74 and 75, provided there has been no actuation of the emergency control devices E. The emergency control circuit may also be completed to ground in many different ways, as, for instance, through the lever 73, the trip 95, or the conductor's cord 103. Any one of the line circuits may be cut out at the master switch and a failure of line potential will result in an automatic application of the brake mechanism.

In Fig. 2 I have shown an arrangement embodying certain modifications in detail. In this arrangement the master switch device A', differs in detail from that shown in Fig. 1 but it has the function of controlling the circuits of the electrical devices which effect the emergency application of the brake mechanism, and cuts out the service release of the brake mechanism. In addition to this function of the master switch it also combines the functions of electric and pneumatic operation and control of an emergency application of the brakes and a signal device. In this arrangement the master switch employs a pivoted lever 10, having a head 11, peculiarly slotted as at 12, and also having a contact 13. The lever 10 is connected to the line circuit, overhead trolley, third rail, or other line conductor 64, through wire 14. The contact 13 carried by lever 10, coöperates with a fixed contact 15, while in the peculiar slot 12, is engaged the end of a stem 16, which is connected to a valve 17, arranged to vent fluid under pressure from the brake pipe 19 through the branch pipe 18. The peculiarity of the slot 12 in head 11 is that for a portion of its length it remains curved on an arc concentric with its pivot so that while rocking from "off" toward "on" position it will retain the stem 16 locked therein, while for the remaining portion of its length said slot is so shaped as to thereafter release said stem. The stem 16 is retained in locking engagement with the head 11 until the circuit connection between contacts 13, 15, is completed. Fluid vented from the train pipe 19 by operation of the valve 17 may be employed to actuate a signal device 20 which in this instance is a whistle. Associated in the circuit which the master switch controls is the motorman's brake valve B', by which a service application of the brakes may be effected in the ordinary and usual way, but which also may be manipulated to control an emergency application of the brakes or the supply of additional pressure to the brake mechanism to make a quick stop of the car or train in case of emergency exigency. The motorman's brake valve B' includes an operating handle 21, which controls contacts 22 and 23 arranged respectively in the pneumatic service and emergency application positions of the brake valve so that in said positions current will be supplied from the contact 15 through wire 111 and the handle 21 to said contacts. The stem 16 has a portion 24 which forms the core of a solenoid 25, the coils of which are in a branch of the circuit controlled by the contacts 13 and 15, which branch is grounded as at 26. Also connected to move with stem 16, is the bridging contact strip 28, coöperating with contacts 31, 32. These contacts, when bridged, serve to complete a circuit adapted to be supplied with current from the car motor whereby to utilize the current generated thereby when operating as a generator, to effect either a service or an emergency application of the brakes. The motor is indicated at M, and when operating in the normal manner as the running motor of the train, it receives current from the trolley, third rail or other source 64 in the usual manner as indicated at 33, the same being controlled by an ordinary reversing switch indicated generally by reference letter K, the function of which when actuated is to reverse the motor connections, in case the supply or line current should fail, thereby enabling the motor to run as a generator. The reversing switch K, may be controlled in any suitable way, as, for instance, by a magnet L, arranged and operating to hold the reversing switch K in position to maintain proper circuit connections to supply the motor with current. But should the line current fail for any reason, the reversing switch operating magnet L is deënergized, thereby reversing the motor connections and enabling the same to operate as a generator. The current thus generated is supplied through a conductor 30, contacts 31, 32 and wire 29 to an electro-pneumatic device E' which controls the application of the brakes and thence by wire 110 to the local generator circuit, as will presently be more fully explained. Included in the circuit which is controlled by the master switch A' and the motorman's brake valve B', and also in the circuit supplied by the motor when acting as a generator, is a device indicated generally, by reference sign O, which in this instance, is in the form of a solenoid 34, the function of which is to control the service release of the brake mechanism, thus establishing an interlock relation between the electro-pneumatic control system and the regular service control which prevents a release of the brakes, when once applied in emergency application, by any manipulation on the part of the motorman of the motorman's service control. In the accomplishment of these functions the solenoid 34, controls a bridging strip 35 which coöperates with contacts 36, 37, the arrangement being such that the energization of the solenoid 34, which takes place when the electro-pneumatic application of the brakes is effected, will cause the service release device R' to be closed, current being supplied to the magnet 34 from supply wire 14 through contacts 13 and 15, wire 111, either the contact 22 or 23, according to the position of the brake valve handle 21, to wire 115, thence through magnet 34 and wire 110 to ground wire 117. The energization of magnet 34 then causes the bridging strip 35 to open the circuit through wire 114, so that the release magnet 113 is deënergized and the exhaust valve controlled thereby is thus allowed to close. When the line current fails, the reverse switch operates to change the connections of the car motor M, so that the same operates as a generator in a closed circuit and as the failure of line current also causes the deënergization of magnet 25, the contact strip 28 bridges the contacts 31 and 32 so that a circuit is closed through the emergency magnet E' as follows: from the closed generator circuit through wire 30, contact 31, bridging strip 28, contact 32, wire 29, magnet 34, and wire 110. The magnet 34 being energized by current from the motor M acting as a generator the bridging strip 35 is actuated to open the release magnet circuit at the contacts 36 and 37, so that the release magnet R' is deenergized and the electric release valve thus closed to prevent exhaust of fluid from the brake cylinder, thereby preserving the emergency application of the brakes by preventing the service release of the brakes.

From the foregoing description it will be observed that I provide various means for effecting an application of the brakes, as, for instance, the usual service pneumatic control, the usual electric service application, an auxiliary emergency application which may be a service application or may be a reinforcement of a service application; and an emergency application may be effected automatically in various ways and under various exigencies arising in the operation of street railway systems. It will also be observed that I utilize the motor as a generator under certain contingencies of operation, and apply the current generated thereby to effect an application of the brakes. I also provide means whereby, when in emergency application the control of the release is taken away from the motorman; and I employ a master switch having such relation that the various electric circuits may all be cut out or any desired one or more may be retained in operative connection for use. These various devices and features are combined together in such manner as to afford the greatest protection to life and property in handling passenger traffic at high speed of operation required for rapid transit, and in handling congested traffic. The cars or trains may be operated with increased safety at closer intervals and at high speeds between stops, and a greater number of cars may be coupled up into a train than heretofore has been practicable without danger resulting from serial brake applications throughout a long train. It will also be seen that each car has a similar equipment throughout, and consequently the work of making up trains is greatly facilitated, by thus providing a multiple unit brake control system of the nature and character above referred to.

Many of the devices and parts constituting the usual brake equipment of the cars are not shown, or are shown only in diagrammatic outline, but sufficiently to show the relation thereof and the functions performed in the complete system by the essential features of my invention.

Many variations, changes and modifications in the details of construction and arrangements of the various parts will readily occur to persons skilled in the art and still fall within the spirit and scope of my invention. I do not desire, therefore, to be limited or restricted to the exact or any specific details shown and described, in the broadest scope of my invention as defined in the claims. But Having now set forth the object and nature of my invention, and various constructions and arrangements embodying the principles thereof, and having described the same, their purpose, function, coöperative relation and operation, what I claim as new and useful, and of my own invention, and desire to secure by Letters Patent is:—

1. In an electro-pneumatic brake, the combination with an electro-pneumatic device for effecting a service application of the brakes, an electro-pneumatic device for effecting an emergency application of the brakes, and a motorman's brake switch for controlling the circuits of said devices, of a master switch for also controlling said circuits.

2. In an electro-pneumatic brake, the combination with electro-pneumatic devices for respectively effecting a service application, an emergency application, and the release of the brakes and a brake switch for controlling the circuits of said devices, of a master switch for also controlling said circuits.

3. In an electro-pneumatic brake, the combination with a plurality of circuits for controlling the brakes and a brake switch for controlling said circuits, of a master switch for also controlling said circuits.

4. In an electro-pneumatic brake, the combination with a plurality of circuits for controlling the brakes and a brake switch for controlling said circuits, of a master switch for also controlling said circuits and adapted to render one or more of said circuits ineffective.

5. In an electro-pneumatic brake, the combination with electro-pneumatic devices for controlling the brakes and a brake switch for controlling the electric circuits of said devices, of a master switch for also controlling said circuits and means associated with said master switch for effecting an application of the brakes.

6. In an electro-pneumatic brake, the combination with electro-pneumatic devices for controlling the brakes and a brake switch for controlling the electric circuits of said devices, of a master switch for also controlling said circuits and an electro-pneumatic device associated with said master switch for effecting an application of the brakes upon failure of line current.

7. In an electro-pneumatic brake, the combination with electro-pneumatic devices for controlling the brakes and a brake switch for controlling the electric circuits of said devices, of a master switch for also controlling said circuits and an electro-pneumatic device associated with said master switch and having its circuit controlled by said master switch for effecting an application of the brakes upon failure of line current.

8. In an electro-pneumatic brake, the combination with a brake pipe, a reduction in pressure in which operates to apply the brakes, electro-pneumatic devices for also controlling the brakes, and a brake switch for controlling the electric circuits of said devices, of a master switch for controlling the circuits of said devices and an electro-pneumatic device associated with said master switch for venting fluid from the brake pipe upon failure of line current.

9. In an electro-pneumatic brake, the combination with electro-pneumatic devices for controlling the brakes and a brake switch for controlling the electric circuits of said devices, of a master switch for also controlling said circuits and means associated with said master switch for warning the operator when the brakes are applied.

10. In a multiple unit electro-pneumatic brake control system for cars, the combination with brake applying devices, of electro-pneumatic means for controlling the same, a circuit therefor, a contact arranged in said circuit, a rocking device associated therewith, grounded contacts on opposite sides of said rocking device adapted to be connected to said device upon movement thereof.

11. In an electro-pneumatic brake, the combination with electro-pneumatic devices for controlling the brakes and manually operated means for controlling the circuits of said electro-pneumatic devices, of a master switch for controlling the current supply for operating said devices and means associated with said switch for effecting an application of the brakes.

12. In an electro-pneumatic brake, the combination with manually operated means for controlling the brakes electrically and pneumatically, of a master switch for controlling the current for the electric manipulation of the brakes and means associated with the master switch for effecting an application of the brakes upon failure of current.

13. In an electro-pneumatic brake, the combination with electro-pneumatic devices for controlling the brakes, of a master switch for controlling the current for said electro-pneumatic device and an electro-pneumatic device associated with the master switch and having the electric circuit thereof controlled by the master switch and adapted to effect an application of the brakes upon movement of the master switch to off position.

In testimony whereof I have hereunto set my hand in the presence of the subscribing witnesses, on this 15th day of April A. D., 1910.

JAMES S. DOYLE.

Witnesses:
MAE W. CLINTON,
CLARENCE HUNICHE.